(No Model.) 2 Sheets—Sheet 1.
O. DONNELLY & C. T. BRIDE.
APPARATUS FOR CLEANING SEWERS.
No. 402,908. Patented May 7, 1889.
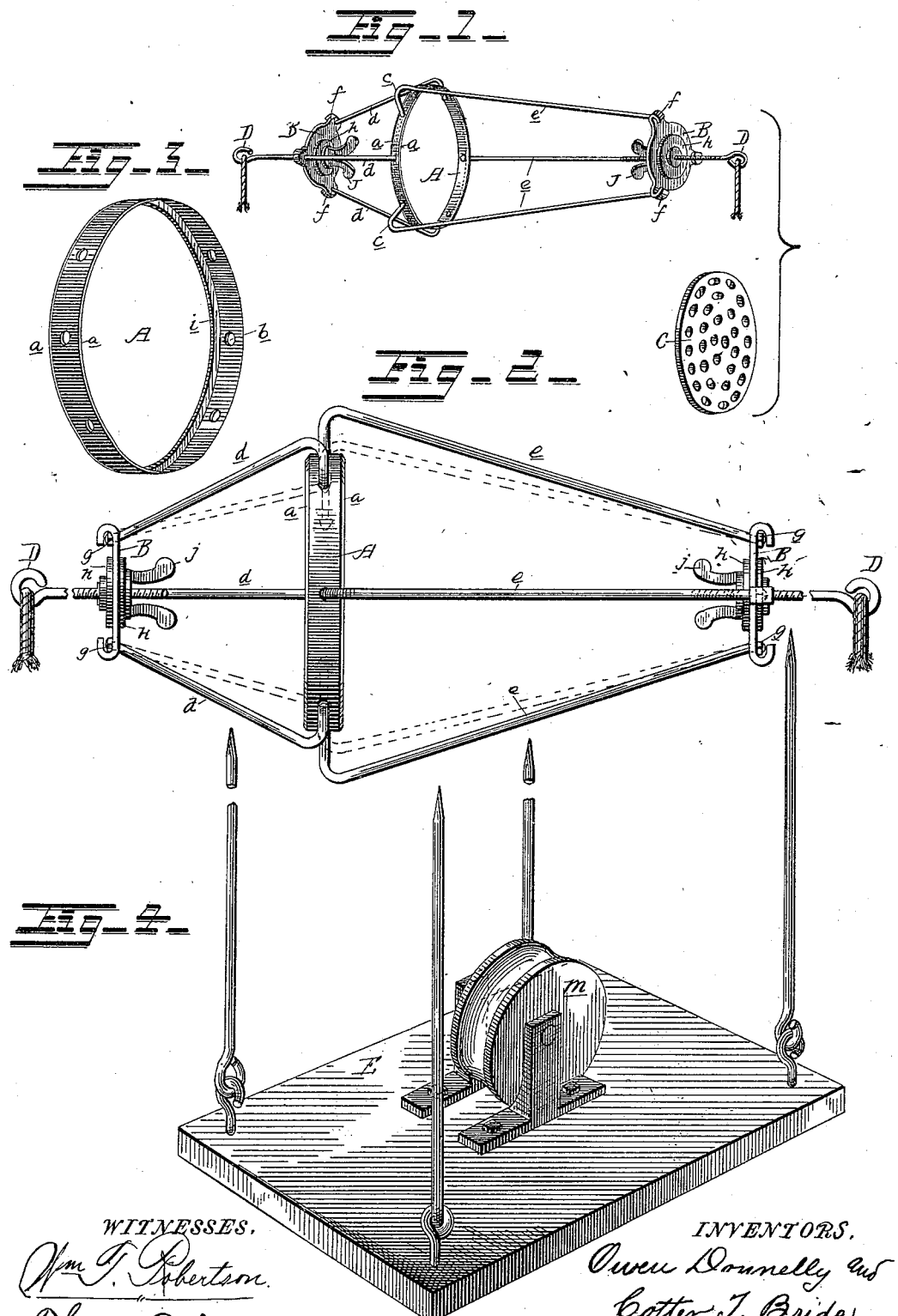
WITNESSES.
INVENTORS.

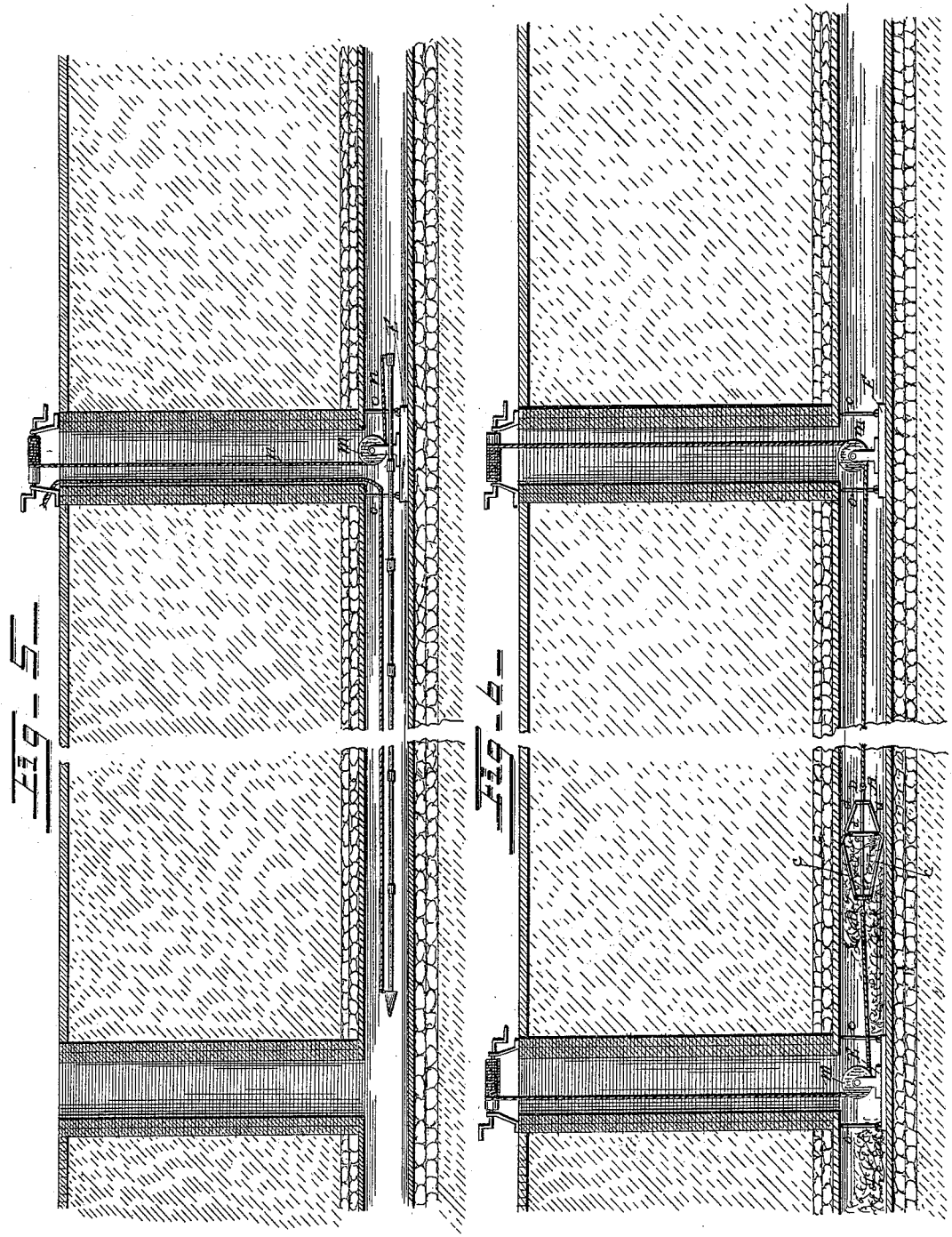

UNITED STATES PATENT OFFICE.

OWEN DONNELLY AND COTTER T. BRIDE, OF WASHINGTON, DISTRICT OF COLUMBIA.

APPARATUS FOR CLEANING SEWERS.

SPECIFICATION forming part of Letters Patent No. 402,908, dated May 7, 1889.

Application filed December 21, 1888. Serial No. 294,302. (No model.)

*To all whom it may concern:*

Be it known that we, OWEN DONNELLY and COTTER T. BRIDE, citizens of the United States, residing at Washington, in the District of Columbia, have invented certain new and useful Improvements in Apparatus for Cleaning Sewers; and we do hereby declare the following to be a full, clear, and exact description of the invention, such as will enable others skilled in the art to which it appertains to make and use the same.

This invention relates to certain new and useful improvements in apparatus for cleaning conduits, sewers, and the like; and the same consists, substantially, in such features of construction, arrangement, and combinations of parts as will hereinafter be more particularly described or pointed out.

There have been a number of apparatus devised for a similar purpose as the present; but with many of those now in use it frequently happens that it is entirely impossible to draw the same through the conduit or sewer, owing either to obstructions caused by irregularities in the sewers themselves or by the formation in hard deposits of mud, filth, and roots washed or carried into the sewers; also with other apparatus at present in use other disadvantages arise from the imperfect construction and arrangement of their several operative parts, and, besides, in many instances a vast amount of time, labor, and expense is incurred from their use.

Our invention is designed to overcome the principal disadvantages of former apparatus referred to, and has for its object to provide an apparatus for effectually cutting up or loosening the accumulations of sewers and conduits, so as to enable such accumulations to be much more readily removed.

The invention also has for its object to provide apparatus of the character referred to which is so constructed and arranged as that in being drawn through a sewer or conduit any inequality or irregularity of dimensions thereof will be readily conformed to and the device thereby permitted to pass obstructions of considerable size without hinderance to the passage of the apparatus through the sewer.

The invention also has other objects in view, all as will more fully hereinafter appear when taken in connection with the accompanying drawings, wherein—

Figure 1 represents a view in perspective of a sewer-cleaning apparatus constructed in accordance with our invention, and Fig. 2 is an enlarged side view thereof. Fig. 3 represents a detail of a modification of the circular knife, and Fig. 4 is a view in perspective of a platform and pulley made use of in the practice of the invention. Fig. 5 is a sectional view of a part of a sewer system, showing the manner in which an opening is made through accumulations therein for the passage of the pull or draw rope for the cleaning apparatus. Fig. 6 is a similar view representing the manner in which the apparatus itself is drawn through a sewer or conduit.

Preliminary to the practice of our invention, when one or more sections of a system of sewerage is to be cleaned, we begin, say, at any man-hole of the system and take what we term or style a "starter" for creating an opening through the clogged-up interior of the sewer for the passage of the rope by which our apparatus is subsequently drawn through to loosen and cut up the accumulations, so as to be easily removed on the fitting in or insertion of the gate, which we also employ. The said starter is attached or secured to one end of a short section of ordinary narrow pipe, (the said starter also having attached thereto the rope designed to pull the cleaner through,) and to the opposite end of such pipe is attached the end of a rope or chain passing around a pulley located in the bottom of the man-hole and over a windless situated across the top of the man-hole. The windlass is turned in the direction to wind up the rope or chain, and this action forcibly drives forward the section of pipe carrying the starter for a distance equal to about its length, and then another section of pipe is screwed onto the first and the same operation repeated by adding other sections of pipe and forcing the whole through the sewer until the next man-hole is reached, at which time the several sections of pipe may be either unscrewed from each other and removed to enable the cleaning apparatus proper to be drawn through or the said sections of pipe may be successively screwed together again and forcibly projected in the same manner through the next succeeding section of sewer until all the sections of the system shall have been cleaned or worked out.

The sewer-cleaning apparatus constructed in accordance with our invention consists of a strong circular metallic knife having opposite cutting-edges, the said ring or knife also being so constructed as to receive and hold a removable gate for drawing or carrying out the filth or débris subsequent to the passage of the apparatus through the sewer to cut up said accumulations. In instances, however, where the accumulations are of a soft and loose nature the gate may be employed in the first instance, and thereby dispense with any subsequent or further passage of the apparatus through the sewer.

The knife referred to should in practice be of a diameter somewhat less than the diameter of the sewer or conduit itself; but in order that the same may be evenly and perfectly drawn and guided we resort to the use of spring rods or arms which are of a bulged or expanded form to move against the inner walls or sides of the sewer, and they also enter the knife in such manner as to hold the same in a position to be drawn through the sewer by a rope or chain attached to the plates which serve to hold the free ends of said arms or rods together. On encountering obstructions in the sewer or any inequalities of surface thereof the said spring rods or arms will in every instance yield together or be collapsed in such manner as to conform to such inequalities, ride over obstructions, and permit of the knife being drawn against the obstruction and break it up or separate it to a condition by which the same can be drawn out.

Reference being had to the several parts of the drawings by the letters marked thereon, A represents the circular knife, having opposite cutting-edges $a\ a$, and formed at intervals of its body with openings $b$, designed to receive alternately from opposite sides of said knife the curved ends $c$ of a shorter set of spring rods or arms, $d$, and a larger set, $e$, the two sets of arms being preferably of different lengths, although, if desired, they may be of the same length. The outer ends of each set of said spring rods or arms are received into and rigidly held or secured by plates B B, which are preferably formed with lugs or ears $f$, through which the ends of the rods pass and are secured by nuts $g$, as shown.

In order to prevent distortion or bending of the outer ends of the arms from encounter with sharp obstructions, we preferably turn the lugs or ears $f$ over the same outwardly, as clearly shown in the drawings; but it is obvious that the ends of said arms may be held together in many ways which would be considered as simple modifications.

After the apparatus has been drawn through a sewer in the manner represented by Fig. 6, we preferably insert within the knife a panel or gate, C, which may be of any construction, but preferably having perforations or openings, so as to permit passage therethrough of soft material as the apparatus is being worked or drawn.

In use the gate could be held to its work by reason of its resting against the inner projecting ends of the sets of spring-rods $d$ and $e$; but in instances where considerable resistance is offered by the accumulated masses of material in the sewers the friction between the gate and said inner projecting ends of the arms is so great as to prevent true and perfect compression or collapsibility of said arms to conform to obstructions, and in such cases I construct the knife with an inner bead or flange, $i$, (see modification, Fig. 3,) against which the gate rests free of contact with the ends of the arm.

Many forms of attachment of the pull ropes or chains to the ends of the apparatus could be resorted to; but as a preferred and simple construction of attachment we resort to threaded eyebolts D D, passing through the plates B B, and tightly secured in place by nuts $j\ j$, a washer, $k$, being also preferably employed to each side of said plates.

We desire to call attention at this point to a platform device we use at the bottom of the man-hole to obtain the proper working or result. The said platform E supports a grooved wheel or pulley, $m$, around which passes the rope $n$ used to shove the pipe forward. The said platform is also provided with hinged arms $o$, which are turned up to encounter the upper sides of the sewer, so as to prevent the platform and pulley from being lifted in the working of the windlass to obtain the desired amount or extent of power to project the pipe forward the necessary or desired extent.

To prevent endwise movement of the platform or base-plate E when the rope or cable is pulled upon, strips or beams of wood may be temporarily nailed to the same to come before or extend across the sewer-openings communicating with the interior of the man-holes. Various other contrivances could also be resorted to for the same purpose, as is very evident; but they need not, essentially, constitute a part of the invention.

From the foregoing description it is thought the construction and arrangement of the parts of our apparatus, as well as their working or operation, will be thoroughly understood; and we desire to state that we do not wish to limit ourselves to the precise details herein shown and described, as it is obvious that many simple changes could be made therein and still be within the scope of our invention.

Having thus described our invention, what we claim as new, and desire to secure by Letters Patent, is—

1. In sewer-cleaning apparatus, the combination of a circular knife and a series of spring rods or arms extending therefrom in opposite directions, the same being compressible or collapsible and designed to move against the walls of the sewer, substantially as and for the purpose described.

2. In sewer-cleaning apparatus, the combination of a circular knife having opposite cutting-edges, compressible or collapsible spring-rods extending from the same in opposite directions, and a removable gate fitting within the said knife, substantially as described.

3. In sewer-cleaning apparatus, the combination of a circular or ring-shaped knife having opposite cutting-edges and formed with openings, and a series of arms projecting from said ring in opposite directions, the same having their inner ends turned to enter said openings and their outer ends brought together and secured, and a draw chain or rope, substantially as described.

4. In sewer-cleaning apparatus, the circular or ring-shaped knife, in combination with the spring rods or arms and the plates B B, the said rods or arms having their outer ends passing through the plates and secured by nuts and washers, and the plate having its edge bent over outwardly to protect the ends of the rods, substantially as described.

5. In sewer-cleaning apparatus, the circular or ring-shaped knife provided with openings and having opposite cutting-edges, in combination with spring-arms fitting in said openings from opposite directions, substantially as described.

6. In sewer-cleaning apparatus, the platform E, having mounted thereon the grooved wheel or pulley and provided with the hinged arms o, substantially as described.

In testimony whereof we affix our signatures in presence of two witnesses.

OWEN DONNELLY.
COTTER T. BRIDE.

Witnesses:
E. EVERETT ELLIS,
CURTIS LAMMOND.